United States Patent [19]
Little

[11] Patent Number: 6,158,932
[45] Date of Patent: Dec. 12, 2000

[54] DUAL WINCH RAILCAR LOAD BELT TIE-DOWN METHOD AND APPARATUS

[75] Inventor: Heward Cecil Little, North Vancouver, Canada

[73] Assignee: Westran Holdings LTD, New Westminster

[21] Appl. No.: 09/395,052

[22] Filed: Sep. 13, 1999

[51] Int. Cl.⁷ ........................................................ B60P 7/08
[52] U.S. Cl. .......................... 410/103; 410/98; 410/100
[58] Field of Search ............................. 410/96, 97, 98, 410/100, 101, 103, 106; 24/68 CD, 265 CD; 248/499; 254/217, 221; 105/355; 242/396.4, 407

[56] References Cited

U.S. PATENT DOCUMENTS

| 3,290,010 | 12/1966 | Holman ................................ 410/97 X |
| 3,428,331 | 2/1969 | Morgan et al. ......................... 410/100 |
| 4,045,002 | 8/1977 | Miller . |
| 4,428,099 | 1/1984 | Richmond . |
| 5,024,567 | 6/1991 | Dominguez et al. ................... 410/100 |
| 5,217,208 | 6/1993 | Stephenson . |
| 5,460,465 | 10/1995 | Little ..................................... 410/100 |
| 5,494,387 | 2/1996 | Ruegg .................................... 410/103 |
| 5,899,646 | 5/1999 | Tatina et al. ............................ 410/100 |

OTHER PUBLICATIONS

"Centerbeam Rail Car Web Strap Securement System", May, 1998 brochure of Portec Rail Products Inc., Oak Brook, IL., 7 pages.

Primary Examiner—Stephen T. Gordon
Attorney, Agent, or Firm—Oyen Wiggs Green & Mutala

[57] ABSTRACT

A system for tying a load down on a load deck. A plurality of tie-down assemblies are spaced at a plurality of locations along the side sills. Each assembly includes a first aperture in a vertical wall of one of the side sills; a belt router recessed at a first point beneath the deck and between the side sills, immediately adjacent and inward of the one side sill; a second aperture in the deck, above the belt router; a first belt winder mounted at a second point on the one side sill, below the first aperture; a second belt winder mounted at a third point on the other side sill in alignment with the first belt winder; and, a belt having one end secured to the first belt winder. To tie down a narrow load which does not project beyond the side sills, the belt's opposite end is extended through the first aperture and beneath the deck, around the belt router, through the second aperture and above the deck, over the load, and into engagement with the second belt winder. The belt is then be tensioned by winding it onto the first and second belt winders with the belt remaining flush against a top surface and at least one side surface of the load. The apertures and belt router are not needed to tie down a wide load which projects beyond the side sills; in such case, the belt's opposite end is extended over the load and into engagement with the second belt winder. The belt can then be tensioned by winding it onto the first and second belt winders with the belt remaining flush against a top surface and both opposed side surfaces of the load.

6 Claims, 7 Drawing Sheets

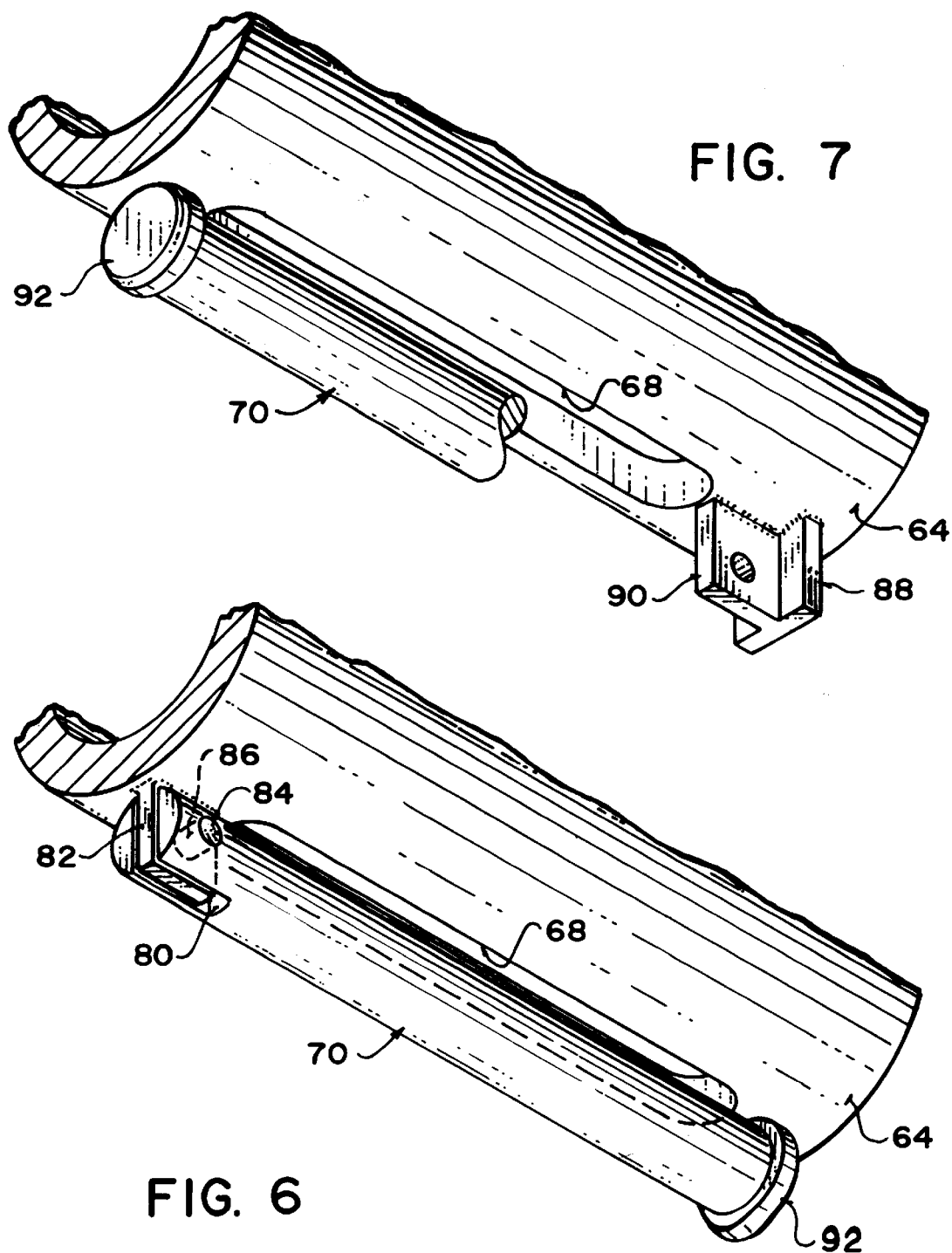

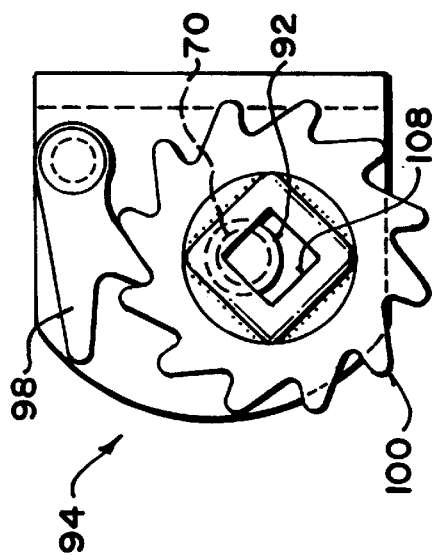
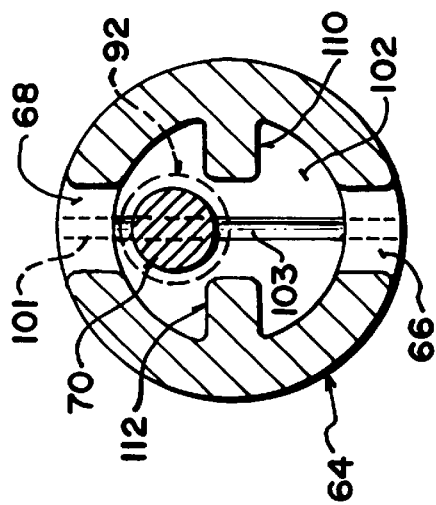
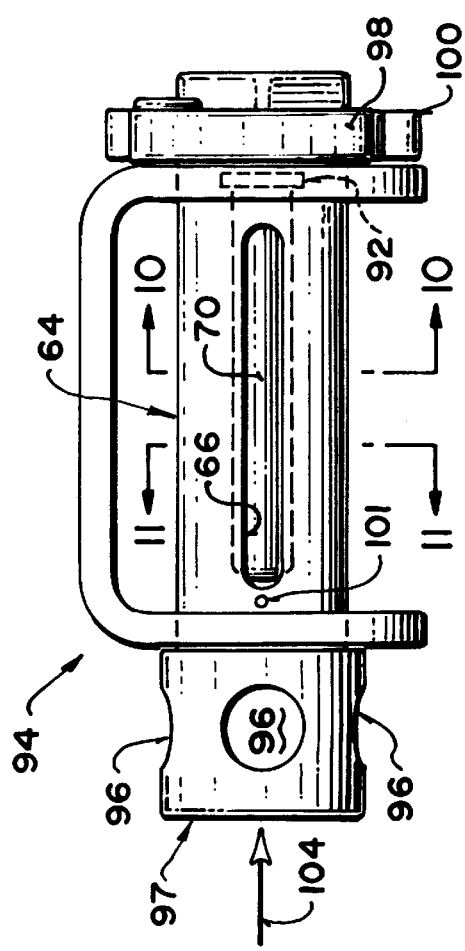
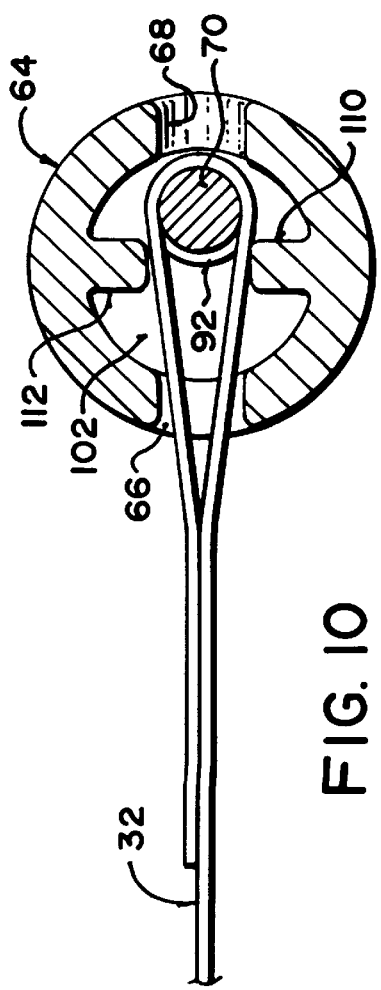
FIG. 9
FIG. 11
FIG. 8
FIG. 10

DUAL WINCH RAILCAR LOAD BELT TIE-DOWN METHOD AND APPARATUS

TECHNICAL FIELD

This invention pertains to a system for tying down loads on railcars. A plurality of belts are tied across the load between opposite sides of and at spaced intervals along the railcar. Winches fixed to the railcar sides are used to tighten the belts. One end of each belt is secured to one of the winches to prevent removal of the belt.

BACKGROUND

FIGS. 1 and 2 depict a prior art railcar load belt tie-down apparatus, as disclosed in U.S. Pat. No. 5,460,465 issued Oct. 24, 1995. Railcar 10 has a flat deck 12 which extends between a pair of vertical bulkheads 14, 16 located at opposed ends of railcar 10. Bulkheads 14, 16 extend transversely with respect to the longitudinal axis of railcar 10. Deck 12 is surfaced with a plurality of planks 20 fixed atop deck support stringers 22 which are in turn supported by transversely extending beams 24. Side sills 26, 28 are fixed to the outer ends of beams 24 and extend longitudinally along the outer upper edges of railcar 10, flush with deck 12.

A plurality of apertures 30 are provided in deck 12 by cutting away sections of planking 20 at pairs of transversely opposed intervals which are spaced along railcar 10 adjacent the respective side sills 26, 28 (only one pair of apertures 30 is shown in FIG. 2). At each transversely opposed pair of apertures 30, a belt 32 is secured at one end to a belt anchor 34 provided beneath one of apertures 30. Belt 32 extends upwardly through deck 12, over the load (shown schematically in dashed outline) and downwardly through the opposite deck aperture 30 to a belt tightener 46 which tensions belt 32 against the load. Optionally, belt 32 may pass through a belt router 48 before engaging belt tightener 46.

The present invention improves upon the prior art by providing belt tighteners (i.e. winches) at each end of each belt. This facilitates more even distribution of the belt tensioning forces applied to the belt since each belt can be tightened at both ends of the belt. To avoid loss or casual theft of the belts, one end of each belt is secured to one of the winches to prevent removal of the belt.

SUMMARY OF INVENTION

In one embodiment, the invention provides a system for tying down on a load deck a narrow load which does not project beyond the deck side sills. A plurality of tie-down assemblies are spaced at a plurality of locations along the side sills. Each assembly includes a first aperture in a vertical wall of one of the side sills; a belt router recessed at a first point beneath the deck and between the side sills, immediately adjacent and inward of the one side sill; a second aperture in the deck, above the belt router; a first belt winder mounted at a second point on the one side sill, below the first aperture; a second belt winder mounted at a third point on the other side sill in alignment with the first belt winder; and, a belt having one end secured to the first belt winder. The belt's opposite end is extendible through the first aperture and beneath the deck, around the belt router, through the second aperture and above the deck, over the load, and into engagement with the second belt winder. The belt can then be tensioned by winding it onto the first and second belt winders with the belt remaining flush against a top surface and at least one side surface of the load. For each adjacent one of the aforementioned locations, the first, second and third points are reversed relative to the respective side sills.

Alternatively, one end of the belt can be secured to the second belt winder, with the belt's opposite end being extendible over the load, through the second aperture and beneath the deck, around the belt router, through the first aperture and into engagement with the first belt winder. The belt can then be tensioned as aforesaid.

In another embodiment, the invention provides a system for tying down on a load deck a wide load which projects beyond the deck side sills. A plurality of tie-down assemblies are spaced at a plurality of locations along the side sills. Each assembly includes a first belt winder mounted at a first point on one of the side sills; a second belt winder mounted at a second point on the other side sill in alignment with the first belt winder; and, a belt having one end secured to the first belt winder and an opposite end extendible over the load and into engagement with the second belt winder. The belt can then be tensioned by winding it onto the first and second belt winders with the belt remaining flush against a top surface and both opposed side surfaces of the load.

The invention also provides a method of securing a belt to a winch drum. A closed loop is formed at one end of the belt. A pin is extended through the loop and positioned parallel to the winch drum's longitudinal axis. One end of the pin is then fastened to the winch drum. Preferably, the winch drum has a slot which extends through the drum, and the loop is passed through the slot before the pin is extended through the loop. The pin is longer than the width of the belt, and the end of the pin opposite the fastened end is enlarged to prevent slippage of the belt over the enlarged end.

The invention further provides an alternative method of securing a belt to a winch drum. In this case, the drum has a hollow cavity. First and second ribs extend into the cavity, with a gap remaining between the ribs. First and second slots extend through opposed sides of the drum. The slots and the gap together form a channel which extends through the drum. A closed loop is formed at one end of the belt. The loop is passed through the channel. A pin having a diameter greater than the width of the gap is then extended into the cavity and through the loop. The pin is longer than the width of the belt. One end of the pin is enlarged to prevent slippage of the pin out of the cavity.

BRIEF DESCRIPTION OF DRAWINGS

FIG. 6 is a partially fragmented pictorial illustration of an alternative winch drum adapted to externally secure one end of a belt to the drum.

FIG. 7 is a partially fragmented illustration of a further alternative winch drum adapted to externally secure one end of a belt to the drum.

FIG. 8 is a top plan view of a winch adapted to secure one end of a belt inside the winch drum.

FIG. 9 is an end view of the FIG. 8 winch, showing the winch ratchet mechanism.

FIG. 10 is an enlarged sectional view taken with respect to line 10—10 of FIG. 8.

FIG. 11 is an enlarged sectional view taken with respect to line 11—11 of FIG. 8.

DESCRIPTION

Figure 1:
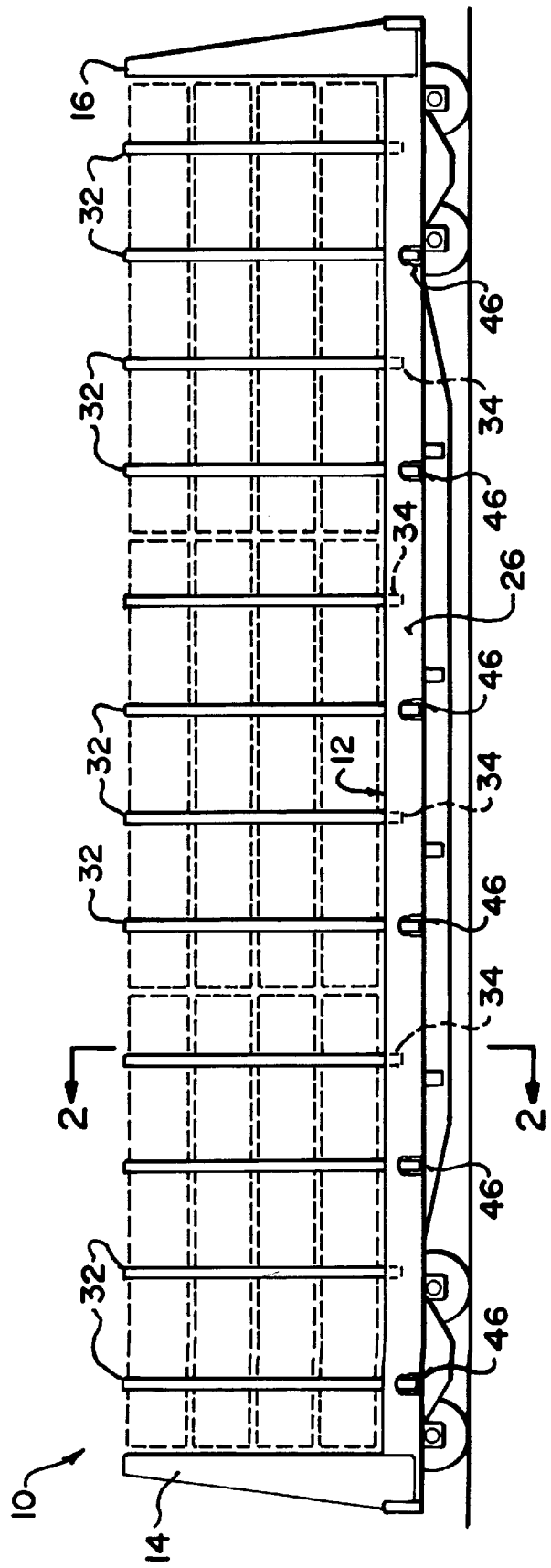
FIG. 1 is a side elevation view of a railcar equipped with a prior art load tie-down apparatus as disclosed in U.S. Pat. No. 5,460,465.
Figure 2:
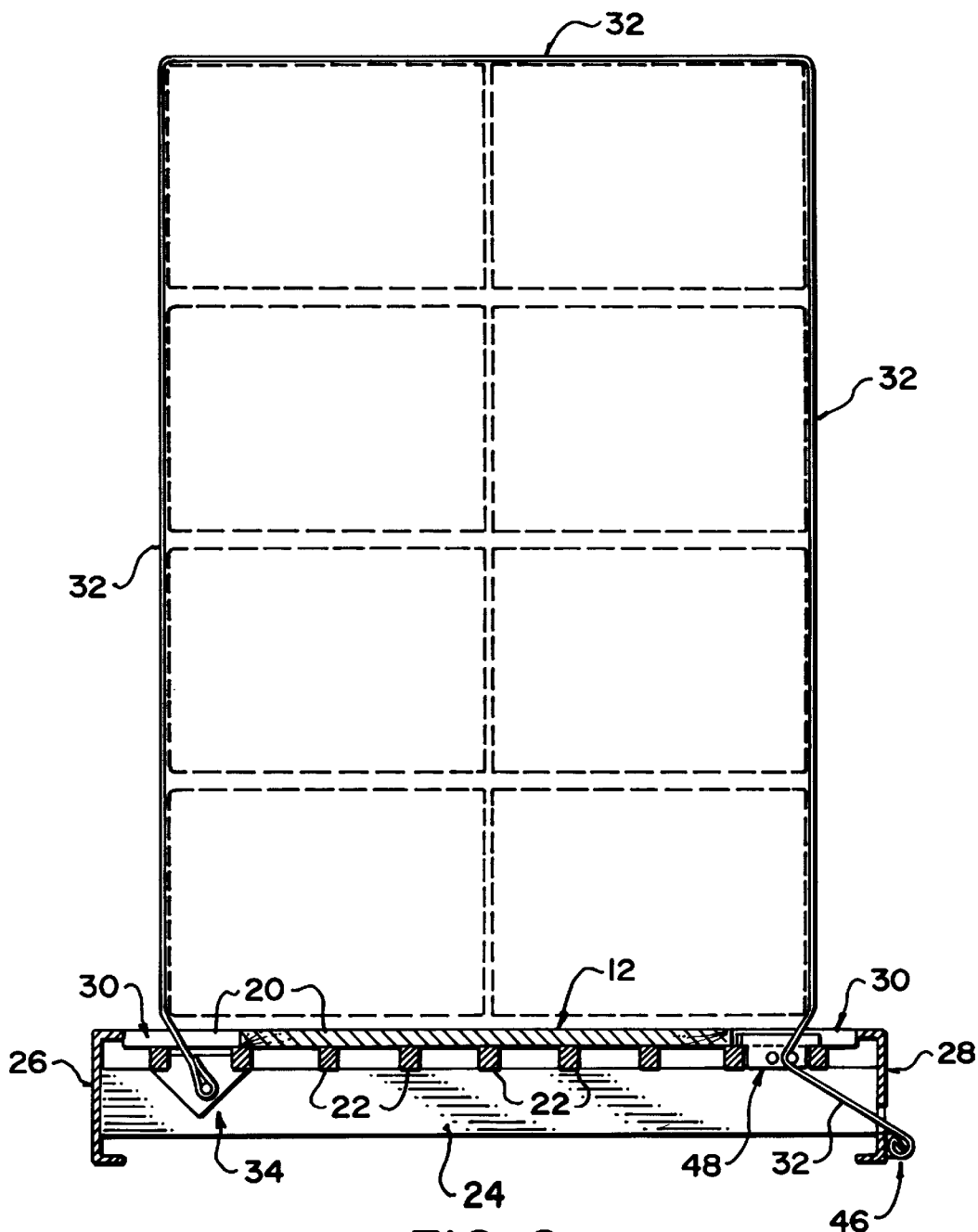
FIG. 2 is a sectional view taken with respect to line 2—2 of FIG. 1.
Figure 3:
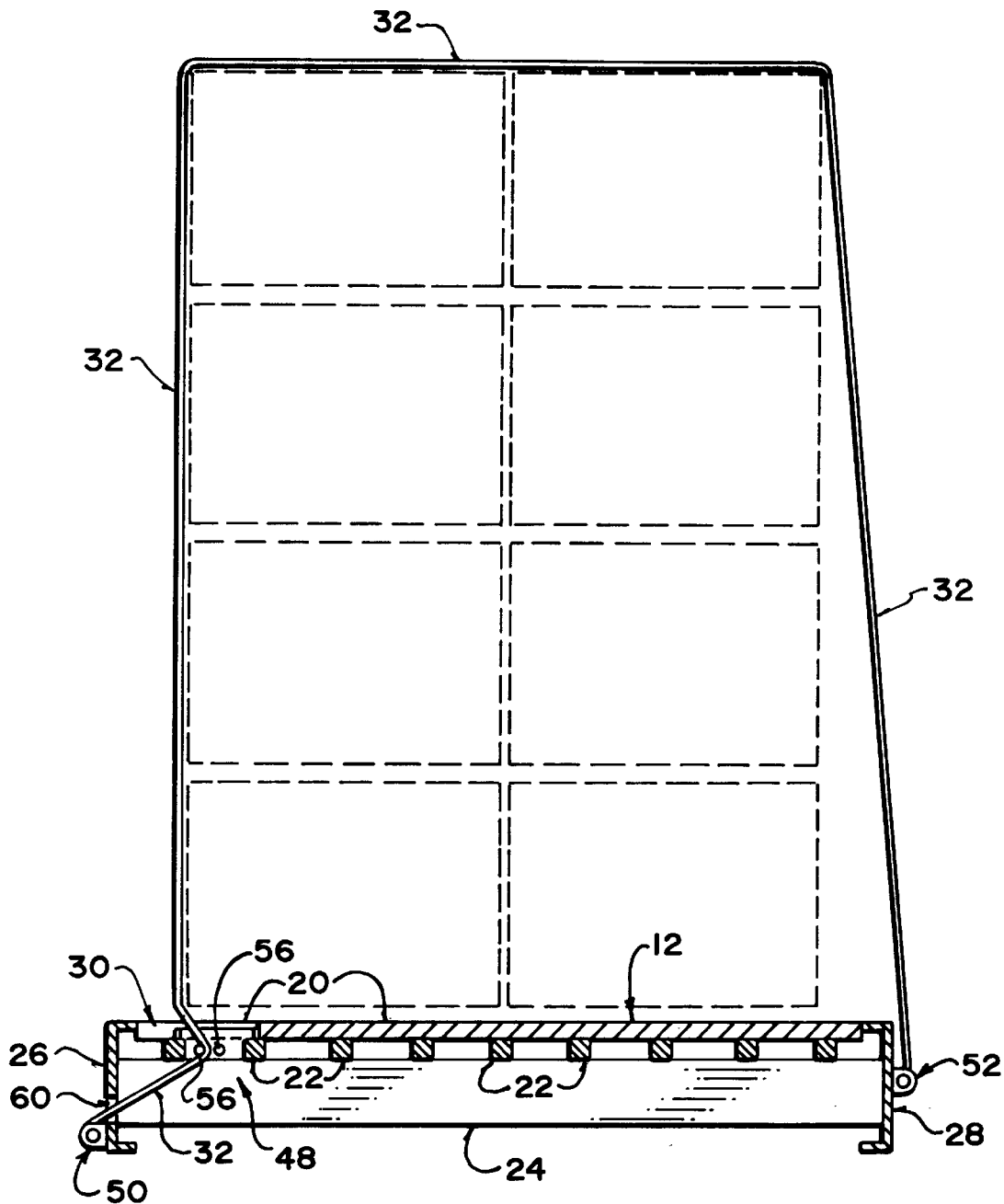
FIG. 3 is a sectional view of a railcar supporting a narrow load tied down in accordance with the present invention.
Figure 4:
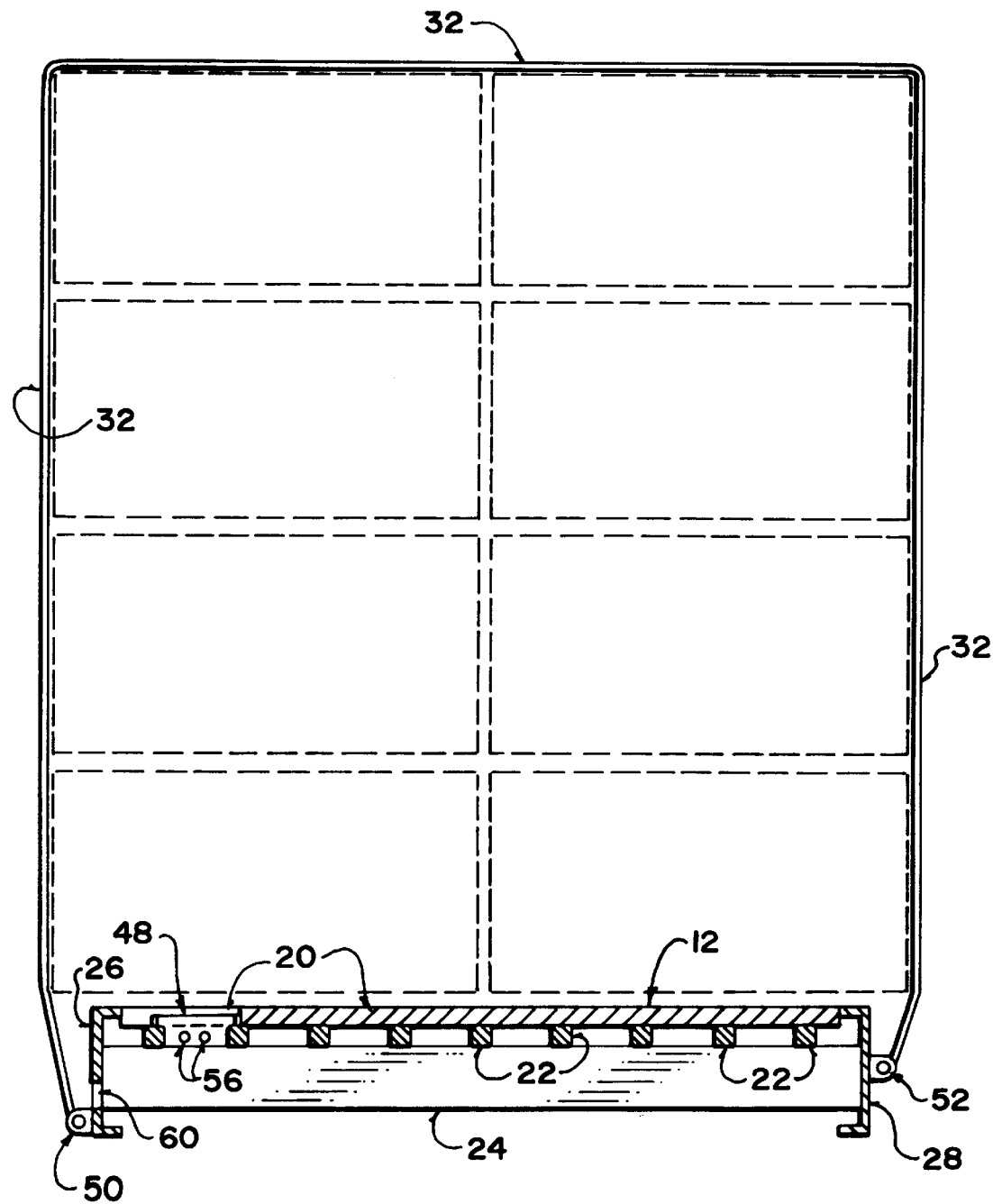
FIG. 4 is a sectional view of a railcar supporting a wide load tied down in accordance with the present invention.

FIGS. 3 and 4 provide sectional views of a railcar having many characteristics in common with the railcar depicted in prior art FIGS. 1 and 2. The same reference numerals are used in FIGS. 1 through 4 to designate railcar features which are the same in each of the four Figures.

In particular, FIGS. 3 and 4 depict a railcar having a flat load deck 12 surfaced with a plurality of planks 20 fixed atop deck support stringers 22 which are in turn supported by transversely extending beams 24. Opposed outer side sills 26, 28 are fixed to the outer ends of beams 24 and extend longitudinally along the outer upper edges of the railcar, flush with deck 12.

Unlike the prior art railcar of FIGS. 1 and 2, in which apertures 30 are provided in deck 12 at pairs of transversely opposed intervals, the railcar of FIGS. 3 and 4 provides only one aperture 30 for each one of the belts 32 used to tie the load (shown schematically in dashed outline) down on the railcar. In particular, for each belt 32, one aperture 30 is provided in deck 12 by cutting away a section of planking 20 near one of side sills 26, 28. FIG. 3 shows one such aperture 30 in deck 12 near side sill 26. For each additional belt (not shown) located on either immediate side of belt 32 shown in FIG. 3, one additional aperture (not shown) is provided in deck 12 near the opposite side sill 28. Thus, one side of every second belt can be positioned flush against one side of the load near side sill 26 (as shown in FIG. 3 in the case of belt 32), and one side of every other belt can be positioned flush against the opposite side of the load near side sill 28.

FIGS. 3 and 4 are similar, except FIG. 3 shows a railcar supporting a narrow load tied down in accordance with the present invention, and FIG. 4 shows a railcar supporting a wide load tied down in accordance with the present invention. That is, the narrow load shown schematically in FIG. 3 does not extend beyond either of side sills 26, 28 whereas the wide load shown schematically in FIG. 4 extends beyond both of side sills 26, 28.

A belt winding means, namely winches 50, 52 is provided. Winches 50, 52 are fixed on side sills 26, 28 respectively. One end of belt 32 is secured to one of the winches, for example winch 50, as hereinafter explained, to prevent loss of belt 32. Belt 32 is then routed through aperture 60 in side sill 26 and then through a belt routing means 48 having one or more belt routing pins 56. More particularly, belt 32 is routed over a selected one of pins 56 to maintain the flat surface of belt 32 firmly flush against the vertically extending side of the load, as shown on the left side of FIG. 3. For example, if the load width is less than that shown in FIG. 3, then belt 32 may be routed over a different one of pins 56 positioned further toward the center of the railcar to maintain flush engagement of the surface of belt 32 with the vertically extending side of the load.

After belt 32 is anchored to winch 50 and extended through belt routing means 48 as aforesaid, the belt's free end is extended upwardly through aperture 30 in deck 12, over the load and downwardly to winch 52. After the belt's free end is engaged with winch 52, both of winches 50, 52 are operated in conventional fashion to wind the opposed ends of belt 32 onto the respective winches 50, 52 thereby tensioning belt 32 at both ends. Conventional ratchet mechanisms provided on the winches maintain tension as the belt is wound upon the respective winches.

FIG. 4 shows the same apparatus as FIG. 3, but with a wider load on the railcar, such that both sides of the load extend outwardly beyond side sills 26, 28 respectively. In this case belt 32 is extended directly upwardly from winch 50 (to which one end of belt 32 is secured as aforesaid) along the left side of the load, over the top of the load and downwardly along the right side of the load to engage winch 52. Winches 50, 52 are then operated as aforesaid to tension belt 32 by winding the opposed belt ends onto the respective winches, to maintain the flat surface of belt 32 firmly flush against both vertically extending sides of the load. It will be noted that belt routing means 48 incorporating pins 56 is not used in the securement of wide loads as depicted in FIG. 4, nor is belt 32 routed through either of apertures 30 or 60 in the securement of wide loads.

The tie-down systems depicted in FIGS. 3 and 4 employ a plurality of tie-down assemblies spaced at a plurality of locations along side sills 26, 28. Thus, if belt routing means 48 is recessed at a "first point" beneath deck 12 between side sills 26, 28 and if winches 50, 52 are mounted at "second" and "third" points on side sills 26, 28 respectively, then for each adjacent one of the aforementioned locations, the first, second and third points are reversed relative to the respective side sills. This alternates, at each adjacent location, the side surface of the load against which belt 32 remains flush, thus balancing the belt's load retention forces on each side of the load along the railcar.

Figure 5:
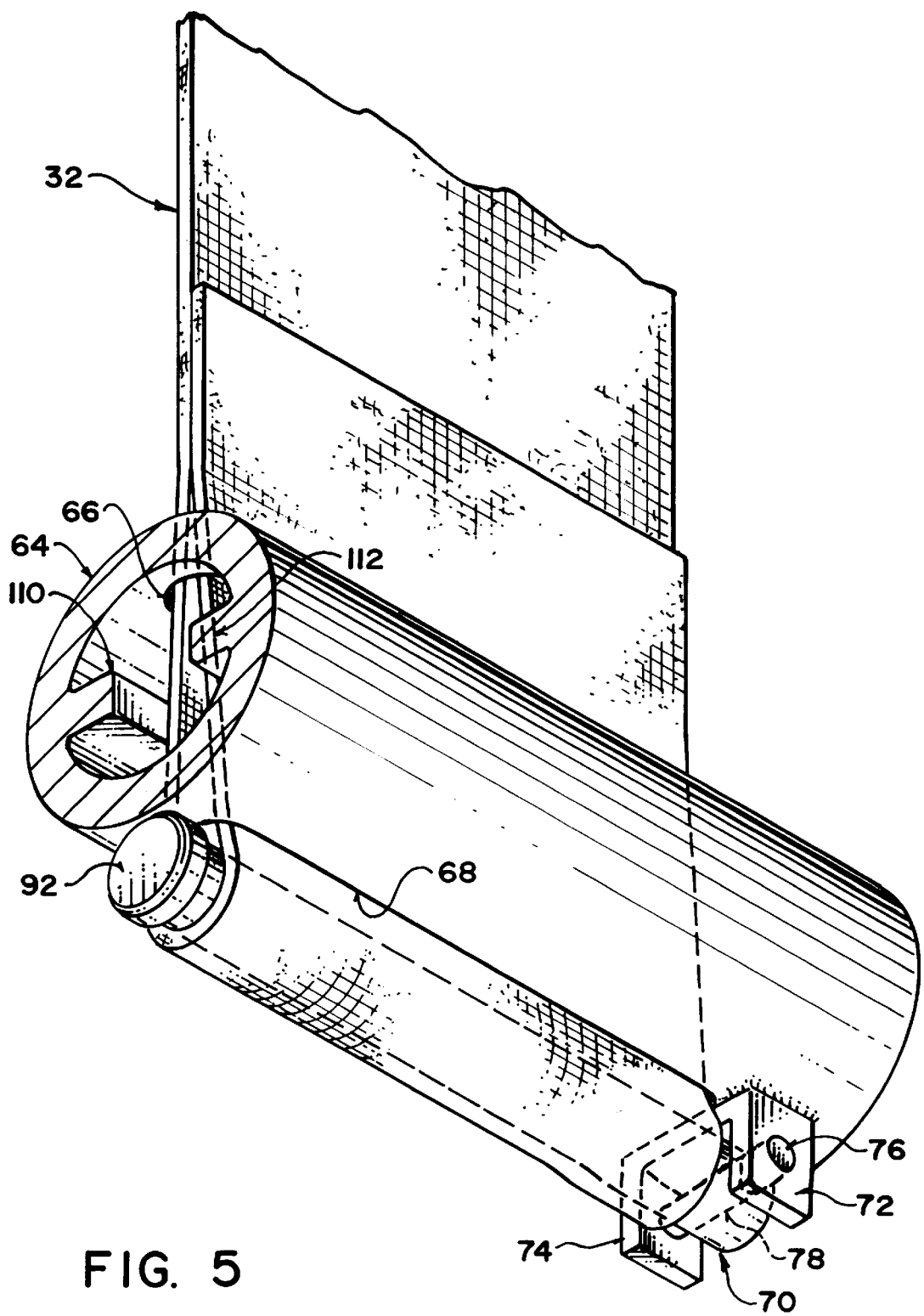
FIG. 5 is a pictorial illustration of a winch drum adapted to externally secure one end of a belt to the drum.

In order to prevent loss or casual theft of the belts, it is necessary to maintain securement of one end of each belt 32 to one or the other of winches 50, 52 at all times. FIGS. 5–11 depict various ways of achieving this objective. For example, FIG. 5 shows a winch drum 64 having opposed slots 66, 68 provided therein. A closed loop is formed in belt 32 by stitching the belt end firmly against the belt. The looped end of belt 32 is then fed through slots 66, 68 as shown in FIG. 5. Pin 70 is passed through the portion of the belt loop which protrudes through slots 66, 68 and positioned parallel to the longitudinal axis of drum 64. Pin 70 is then fixed to drum 64. This can be accomplished by welding a pair of flanges 72, 74 to an external surface of drum 64 and fastening a rivet 76 through an aperture 78 drilled through one end of pin 70 and through flanges 72, 74. Alternatively, as shown in FIG. 6, a slot 80 can be formed in one end of pin 70 and slot 80 fitted over a single flange 82 welded to drum 64, after which rivet 84 is fastened through an aperture 86 provided through the slotted end of pin 70 and through flange 82. FIG. 7 depicts a further alternative in which a "T" shaped flange 88 is welded to drum 64 with flange element 90 oriented to receive pin slot 80 in the same manner as previously described in relation to flange 82 of FIG. 6. An enlarged head 92 is provided on the free end of pin 70 to prevent slippage of belt 32 over the pin's free end.

FIGS. 8 through 11 depict an alternative embodiment in which the looped end of belt 32 is secured inside winch drum 64. FIGS. 8 and 9 also depict further details of winch 94. In particular, a bar may be inserted into one of apertures 96 in drum extension 97 to provide sufficient leverage for rotation of drum 64 during tensioning of belt 32. In order to relieve the tension for release of belt 32 and removal of the load from the railcar, ratchet pawl 98 is lifted upwardly away from the teeth of ratchet wheel 100 to enable free reverse rotation of drum 64.

In the embodiment of FIGS. 8–11 pin 70 is not rivetted or otherwise fastened to drum 64. Instead, the looped end of belt 32 is fed through slots 66, 68. Pin 70 is then inserted, head first, through the belt loop and into the hollow central cavity 102 of drum 64 by passing pin 70 in the direction of arrow 104 through an aperture (not shown) extending longitudinally through drum extension 97 to place pin 70 in the position shown in dotted outline in FIG. 8. The enlarged head 92 of pin 70 prevents pin 70 from passing through aperture 108 provided in ratchet wheel 100 to receive a bar for use in relieving the pressure on pawl 98 in order to lift pawl 98 away from ratchet wheel 100 as aforesaid. If desired, a stop member 103 (FIG. 11) can be inserted through aperture 101 (FIG. 8) to protrude into cavity 102 and prevent withdrawal of pin 70 through drum extension 97. Advantageously, a special tool is required to remove stop member 103 from aperture 101 in order to frustrate casual theft of belt 32.

Drum 64 has a pair of opposed, inwardly projecting ribs 110, 112 (also seen in FIG. 5). The gap between the opposed inward ends of ribs 110, 112 is large enough to permit insertion of the looped end of belt 32 through drum slots 66, 68 as aforesaid. However, the diameter of pin 70 is sufficiently great that once pin 70 is inserted through the looped end of belt 32 as aforesaid pin 70 prevents withdrawal of the looped belt end through the gap between ribs 110, 112, thereby securing the looped belt end inside drum 64 as seen in FIG. 10. It will be noted that the embodiment of FIGS. 8–11 allows belt 32 to be wound smoothly around drum 64. By contrast, the embodiments of FIGS. 5–7 cause some bulging of belt 32 as it is wound around drum 64 since pin 70 is fixed outside drum 64 in these embodiments.

As will be apparent to those skilled in the art in the light of the foregoing disclosure, many alterations and modifications are possible in the practice of this invention without departing from the spirit or scope thereof. For example, persons skilled in the art will understand that although the FIG. 3 narrow load tie-down system has been described with one end of belt 32 being secured to winch 50, it is possible to alternatively secure the belt end to the opposed winch 52 and then route belt 32 over the load to winch 50. As another example, instead of providing an enlarged head 92 on pin 70 in the embodiment of FIGS. 8–11, one may alternatively enlarge the diameter of the entire pin 70 to prevent pin 70 from passing through aperture 108 provided in ratchet wheel 100. The scope of the invention is to be construed in accordance with the substance defined by the following claims.

What is claimed is:

1. A method of securing a belt to a winch drum, said winch drum comprising:
    (i) a hollow cavity within said drum;
    (ii) first and second ribs extending into said cavity to define a gap between said ribs;
    (iii) first and second slots in opposed sides of said drum, said slots and said gap together forming a channel extending through said drum;

said method comprising:
    (a) forming a closed loop at one end of said belt;
    (b) passing said loop through said channel; and,
    (c) extending a pin into said cavity and through said loop, said pin having a diameter greater than said gap.

2. A method as defined in claim 1 wherein said pin has a length greater than a width dimension of said belt, said method further comprising forming an enlarged head on one end of said pin to prevent slippage of said pin out of said cavity.

3. A method as defined in claim 2 wherein said enlarged head is further to prevent slippage of said belt over said enlarged head.

4. Apparatus for securing a belt to a winch drum, said winch drum comprising:
    (i) a hollow cavity within said drum;
    (ii) first and second ribs extending into said cavity to define a gap between said ribs;
    (iii) first and second slots in opposed sides of said drum, said slots and said gap together forming a channel extending through said drum;
    said apparatus comprising a pin insertable into said cavity and through a closed loop formed at one end of said belt, said closed loop extended through said channel before insertion of said pin through said loop, said pin having a diameter greater than said gap.

5. Apparatus as defined in claim 4 wherein said pin has a length greater than a width dimension of said belt, said pin further comprising a head on one end of said pin, said head having a diameter sufficient to prevent slippage of said pin out of said cavity.

6. Apparatus as defined in claim 5 wherein said head diameter is further sufficient to prevent slippage of said belt over said enlarged head.

* * * * *